Patented May 11, 1943

2,318,629

UNITED STATES PATENT OFFICE 2,318,629

LUBRICATING COMPOSITION

Carl F. Prutton, Cleveland Heights, Ohio, assignor to The Lubri-Zol Corporation, Wickliffe, Ohio, a corporation of Ohio No Drawing. Application March 4, 1938, Serial No. 193,960

28 Claims. (Cl. 252—46)

The present invention relates as indicated to lubrication and more particularly to a lubricating composition which is particularly characterized by being capable of withstanding extreme unit pressures between the bearing surfaces which the same is called upon to lubricate, without the disadvantages of instability and gum-forming tendencies which characterize similar lubricating compositions now commonly available.

It is a principal object of this invention to provide a lubricating composition utilizing compounds of sulphur as the means for providing the improved type of lubrication above defined, such compounds being used either in their pure state, or admixed with other lubricating compositions such as mineral oils and the like.

By "extreme pressures" as referred to above, is meant pressures of or in excess of 10,000 pounds per square inch, such pressures now being commonly encountered in hypoid gears, bearings, contact surfaces of cylinders and piston rings in internal combustion engines, and many other points. Such pressures tend to cause the rupture of the continuous "thick film" of lubricant which separates bearing surfaces under more moderate conditions. A region of "thin film" lubrication results which is also sometimes described as "boundary" lubrication.

I am aware that sulphur has been employed in lubricating compositions in the past and that sulphur has been present in lubricating compositions in both free and combined form.

It has been recognized that the principal reason why seizure and scoring of relatively moving metallic surfaces takes place upon failure of the lubricating film therebetween has been due to the fact that as the pressure is increased between the surfaces the same are brought into such close proximity that minute projections extending from the respective surfaces are ultimately brought into overlapping relationship and, as such projections collide, welding takes place, whereupon one of such projections is torn loose from its supporting surface, initiating a seizing or scoring of the surfaces. The prior art has recognized one manner in which the tendency to such seizing and scoring might be reduced; that is, by providing in the lubricating film between the bearing surfaces a component which will chemically react with metallic bearing surfaces to produce a metallic compound acting as an anti-fluxing agent, thus reducing the tendency of the bearing or other metallic surfaces to weld together. The prior art has, as previously indicated, used sulphur either in elemental or combined form as the constituent which has been relied upon to chemically react with the bearing surfaces to provide the film of anti-fluxing material.

When sulphur has been used in combined form, it has usually occurred as a compound resulting from the treatment of a fixed oil with sulphur or sulphur chloride. These compounds which have been thus provided and used have been objectionable for a number of different reasons among which the following are most important:

First, the compounds thus formed have been derivatives of fatty acid glycerides or other compounds of high molecular weight, usually well above 500, and almost invariably above 300. These compounds readily decompose into others which are easily oxidized or which easily polymerize to form gummy precipitates.

Second, the compounds have been such as to readily polymerize upon being maintained at room temperatures, and particularly when subjected to high temperatures for any considerable period of time, thus forming gummy substances which render the lubricating composition unsuitable for use.

Third, the compounds thus provided, due to the complex nature of the materials originally treated to produce the same, were exceedingly complex in character. The complexity of such compounds is objectionable, not so much due to their complexity as due to the fact that in such a large number of individual compounds there is present a number of unusually objectionable ones which, in themselves, render the lubricating composition entirely unsuited for continued use.

Fourth, the principal objection to these prior art uses of sulphur has been that the sulphur, either in elemental or combined form, has been so relatively unstable or so loosely combined as to react readily with iron and bearing metals such as copper and copper-containing alloys at relatively low temperatures to form compounds such as iron sulphide; in other words, the compositions utilizing sulphur as proposed by the prior art have been destructively corrosive.

Probably the principal reason why the prior art compounds have had this last-named deficiency has been due to the fact that the prior art workers have always considered it necessary, in order to provide the anti-fluxing film on the bearing surfaces, to secure the same by means of the action of a normally corrosive component in the lubricating composition.

For the foregoing reasons, such use of sulphur in the past, either in elemental or combined form in certain types of lubricating compositions, has been generally considered as a considerably greater detriment than the advantages resulting therefrom would justify and accordingly, such lubricating compositions including sulphur have never attained any considerable commercial popularity.

It is a principal object of this invention to provide a lubricating composition embodying sulphur in combined form but in such form that the aforementioned disadvantages, always incidental to its use in the prior art, are substantially or entirely obviated without a material reduction in its beneficial effect on the bearing surfaces to prevent seizure therebetween under extreme pressure conditions.

Other objects of this invention will appear as the description proceeds.

To the accomplishment of the foregoing and related ends, said invention, then, consists of the means hereinafter fully described and particularly pointed out in the claims, the following description setting forth in detail certain approved combinations of ingredients embodying my invention, such disclosed means constituting, however, but certain of various forms in which the principle of the invention may be used.

Briefly stated, my invention comprises the discovery that organic sulphur compounds, generally, which will not appreciably react with iron at temperatures below 100° C. and which are thus not corrosive at the temperatures usually encountered in uses to which the lubricating composition according to the present invention is adapted, will, nevertheless, when present in a lubricant film and subjected to the conditions imposed on the bearing surfaces under abnormally high unit pressures, react therewith to form a film which will prevent seizure and scoring at extreme pressures. For certain other uses it is within the contemplation of my invention to utilize organic sulphur compounds of the character described and which will not react with iron below 120° C. and for still other uses it is desirable that such compounds will not react with iron below 140° C. or even 170° C. In order, however, that the organic sulphur compounds should be of the type to form an anti-fluxing film with the relatively moving metallic surfaces under the conditions imposed by extreme pressures encountered in use, they should be such as evidence a marked increase in their reactivity with iron at temperatures below 250° C. and preferably within the range of 100° to 220° C., or still more desirably within the range of 120° to 200° C. For certain uses it may be best to employ sulphur compounds exhibiting a marked increase in reactivity at temperatures even below 170° C. Sulphur compounds such as those sometimes found naturally occurring in mineral lubricating oils are thus without the purview of this invention, many of them not being appreciably reactive with iron even at the decomposition point of the oil.

The stability of the compounds referred to may be conveniently defined according to the temperature at which the compound begins to actively react with metallic iron. One method of performing such a test is to heat a mineral oil solution of the compound with finely divided metallic iron for uniform periods of time, say 60 minutes, and to repeat the tests at increasing temperatures. A certain minimum amount of iron sulphide will be formed even with very stable compounds or with others even at ordinary temperatures. The temperatures at which there is a substantial increase in the amount of iron sulphide formed then gives an indication of the stability of the compound. The higher the temperature at which such increase occurs, the higher the stability. When the relative stability of the various compounds is referred to and given in terms of temperatures, the figures thus used will denote the temperatures arrived at by tests such as the foregoing.

The organic sulphur compounds which may be used in accordance with this invention may generally be defined as those which will not be substantially polymerized when lubricating compositions containing them are maintained at a temperature of 170° C. for a period of four hours.

This invention contemplates the use of organic sulphur compounds above generally defined, either in their pure state or preferably admixed with a suitable lubricating composition such as, for example, mineral oil, vegetable oil, etc., or any lubricating composition of an oily nature. Throughout the ensuing description, the organic sulphur compounds will be sometimes referred to as addition agents. However, when such term is used, it is to be understood that while such particularly named compounds thus identified may advantageously be used in conjunction with other lubricants, such as mineral oil, they may, nevertheless, if of a sufficiently oily nature in themselves, be used in their pure state as the sole lubricant.

The sulphur compounds contemplated by this invention include those compounds which may be described generally as thio-derivatives of organic oxygen-bearing compounds and in addition, such sulphur compounds as do not have corresponding oxygen counterparts; for example, the poly-sulphides.

It is to be noted that the class of compounds contemplated includes compounds which contain other elements than carbon, hydrogen and oxygen in addition to the sulphur, such as the amino compounds. These compounds include organic derivatives of the thio-derivatives of inorganic oxy-acids; for example, the organic thio-sulphates, thio-phosphates and thio-carbonates. The compounds may be classified according to the nature of the oxygen-bearing counterpart, as follows:

ORGANIC SULPHUR COMPOUNDS

*Thio-derivatives of organic oxygen compounds*

I. Classified according to nature of attachment of the sulphur atom to molecule
- A. Sulphur atom directly attached to one or more carbon atoms, as in the case of:
    1. Thio-esters and analogous compounds, e. g.
        - (a) Alkyl sulphides
        - (b) Aryl sulphides
        - (c) Thio-acetals (mercaptoles) such as, thio-acetal, and acetone mercaptole
        - (d) Organic thio-cyanates (R–S–CN)
    2. Compounds containing the $$\diagdown\!\!-\!\!C\!\!-\!\!SH\diagup$$ radicle, e. g.

- (a) Thio-alcohols and thio-phenols (mercaptans)
        Alkyl mercaptans, such as:
            The amyl mercaptans
            Lauryl mercaptan
            Cetyl mercaptan
        Aryl mercaptans, such as:
            Phenyl mercaptan
            Benzyl mercaptan
            Phenyl-ethyl mercaptan
            Diethyl phenyl mercaptan
            Ethyl-phenyl-ethyl mercaptan
            Diphenyl methyl mercaptan
            Triphenyl methyl mercaptan
            The phenylene dimercaptans
            The naphthyl mercaptans
    3. Compounds containing the $$\diagdown\!\!C\!\!=\!\!S\diagup$$ radicle, including

- (a) Thio-aldehydes, e. g.
        The thio-acetaldehydes
        The thio-benzaldehydes
        The thio-furfuraldehydes
    - (b) Thio-ketones, e. g.
        Di-ethyl thioketone
        Di-amyl thioketone
        Thiobenzophenone (benzophenone sulphide)
    - (c) Thio-organic acids, and esters and salts of them; including—
        Thio fatty acids, e. g.
            Thio-acetic acid
            Thio stearic acid
            Dithio-acetic acid
            Dithio-stearic acid
        Thio-aromatic acids, e. g.
            Thio-benzoic acids
            Thio-salicylic acids
            Thio-phthalic acids
            Dithio benzoic acids
            Dithio phthalic acids
        Esters of the above acids, e. g.
            Amyl thio acetate
            Lauryl thio-acetate
            Amyl dithio-acetate
            Methyl thio-stearate
            Diethyl dithio-carbonate
        Salts of the above acids, e. g.
            Sodium dithio-acetate
            Sodium thiobenzoate
            Calcium thio-acetate
            Sodium thio-stearate
            Calcium thio-stearate
            Lead thio-stearate
        Esters and salts of thio-carbonic acids, e. g.
            Diphenyl thiocarbonate
            Xanthic acid
            Ethyl xanthate
            Phenyl xanthate
            Benzyl xanthate
            Acetyl xanthate
            Benzoyl xanthate
            Stearyl xanthate
            Sodium xanthate
            Calcium xanthate
        Organic thio-cyanates and iso-thiocyanates, such as
            Ethyl isothiocyanate
            Benzyl isothiocyanate
            Butyl isothiocyanate
            Lauryl isothiocyanate
    - (d) Thio-amides, thio-anilides, and thio-ureas, e. g.
        Thio-acetamide
        Thio-acetanilide
        Thio-stearanilide
        Thio-benzanilide
        Thio-carbanilide
        Thio-carbamide
        Thio-urethane
        Thio-urea
        Di-amyl thio-urea.
    - (e) Compounds in which the C=S group is included in a ring structure: e. g.
        Thio-quinone
        Thio-chloranil.
        Thio-naphthaquinones
        Thio-anthraquinone
        Thio-phenanthraquinone
        Thio-phthalic anhydride
        Thio-diphenic anhydride
        Diphenylene thioketone (thio-fluorenone)
    - (f) Carbon bisulphide 4. Compounds in which a sulphur atom forms a part of an organic ring structure
        Thiophene-alcohols
        Thiophene aldehydes, e. g. thio-furfural
        Thiophene carboxylic acids, and esters and salts of them
        Thiophene sulphonic acids, and esters and salts of them
        Thiophene sulphinic acids, and esters and salts of them
        Methyl thiophenes
        Thioxene (dimethyl thiophene)
        Thianthrene (diphenylene disulphide) and related compounds
        Diphenylene sulphide
        Thiazole and derivatives—e. g. benzothiazole, phenyl-benzothiazole, and mercapto benzothiazole
        Thiazine, derivatives of—e. g. methyl benzothiazine
        "Biophen"
    5. Sulphur atom attached in the form of an inorganic radicle, e. g.
        Thio-arsenite
        Thio-hypo-chlorite
        Thio-phosphite
        Thio-sulphonic acid and esters and salts
        Thio-sulphinic acid and esters and salts
- B. Sulphur atom attached to molecule through the means of some other atom, i. e. in the form of an inorganic radicle, e. g.
    Thio-arsenate
    Thio-phosphate
    Thio-sulphate
    Thio-sulphite
    Sulphate
    Sulphite Of the organic sulphur compounds which do not have stable analogous oxygen counterparts, those included in the following table have been found particularly useful:

A. Sulphones
   Sulphoxides
   Sulphonic acids and esters and salts of them
   Sulphinic acids and esters and salts of them
B. Poly-sulphides, notably
   1. Alkyl disulphides
   2. Aryl disulphides
   3. Mixed alkyl-aryl disulphides
   4. Poly-sulphides, e. g. those formed from the above (or from sulphides) by the addition of sulphur NOTE.—The addition agents contemplated hereby also include compounds such as those listed above which have other substituent groups, such as:
   1. Halogens
        Chlorine
        Bromine
        Fluorine
        Iodine
   2. Oxygen-bearing substituents:
        The ether group
        The $$\diagdown\!\!-\!\!C\!\!-\!\!OH\diagup$$

radicle
        The carbonyl radicle, $$\diagdown\!\!C\!\!=\!\!O\diagup$$

for example
        As existing in
            Amides
            Aldehydes
            Ketones
            Thio-acids and esters and
            Salts of thio-acids
   Inorganic substituents in which the oxygen atom is directly attached to the carbon atom:
        Arsenite
        Benzamide
        Hypochlorite
        Phosphite
        Thiophosphate
        Thiophosphite
        Beta hydroxylamine
   Other oxygen-bearing substituents as follows:
        Arsenate
        Chlorate
        Chlorite
        Cyanate
        α hydroxylamine
        Nitrate
        Nitrite
        Nitro
        Nitroso
        Oxime
        Perchlorate
        Phosphate
        Sulphate
        Sulphite
        Sulphinic acid
        Sulphone
        Sulphonic acid
        Sulphoxide
        Thio-sulphate 3. Oxygen-free substituents:
   Amino, and substituted amino groups
   Imino
   Azo
   Hydrazo
   Hydrazi
   Nitrile
   Isonitrile
   Aryl and substituted aryl, such as:
      Phenyl
      Naphthyl
      Anthracyl
      Tolyl
      Xylyl
      Benzyl
   Alkyl, such as:
      Methyl
      Ethyl
      Propyl
      Iso-propyl
      Stearyl
      Lauryl An important group of compounds for my purpose are those consisting of the alkyl and aryl mercaptans and their oxidation products. Examples of the oxidation products of mercaptans (RSH, where R is either an alkyl or an aryl radicle) are as follows:

1. Disulfides                      RS—SR
2. Thiosulphonic acid esters      $RSO_2SR$
   (sometimes called disulphoxides)
3. Mono-sulphones               $R_2SO_2$
4. Disulphones                 $RSO_2SO_2R$ Another important group consists of the alkyl and aryl sulphides ($R_2S$) and oxidation products of them, e. g., sulphoxides ($R_2SO$).

Some of the sulphur compounds contemplated by this invention may best be described according to the method of preparing them; as for example, the products resulting from the reaction of:

I. A. Organic halogen compounds, preferably of the type in which at least a part of the halogen is readily hydrolyzable (as distinguished from those compounds in which all of the halogen is attached to a benzenoid ring structure) such as:
  (1) Halogen-bearing derivatives of aliphatic compounds, such as those produced by the direct halogenation of aliphatic compounds;
or
  (2) Halogen-bearing derivatives of alkylated aromatic compounds of the type in which at least part of the halogen is attached to the alkyl group, as for example, those produced by chlorination in the presence of active rays or a catalyst such as $PCl_3$ and in the absence of catalysts of the type which add chlorine to the ring structure, such as iron, iodine, etc., preferably at elevated temperatures;
  (3) Halogen-bearing derivatives of alicyclic compounds, as for example:
    (a) Cyclo-paraffins (naphthenes)
    (b) Hydrogenated aromatic compounds
    (c) Alkyl derivatives of (a) and (b)
    (d) Oxygen-bearing derivatives of (a), (b) and (c):
With a reagent,
B. Sulphur or inorganic sulphur compounds including:
  Metallic and ammonium sulphides, and the corresponding hydrogen sulphides and polysulphides NOTE.—The materials to be halogenated to form (A) are not restricted to hydrocarbons but may advantageously contain other elements, notably oxygen. For example, a preferred type of product is obtained by the halogenation of fatty acids and the subsequent reaction of the halogenated material (preferably under pressure) with anhydrous sodium sulphide or sodium hydrogen sulphide.

II. A. Substituted ammonias (primary, secondary, or tertiary amines), for example, any of the following:
    Mono-ethanolamine
    Mono-butyl amine
    Di-butyl amine
    Mono-amyl amine
    Di-amyl amine
    Aniline
    Diphenyl amine
    Phenylene diamine
    Toluidine
    Xylidene
    Methyl-aniline
    Dimethyl-aniline
    Amino-diphenyl
    Naphthyl amine
With
B. Compounds containing the —SH or S radicle such as:
  (1) Hydrogen or ammonium sulphide (Note: [1])
  (2) Metallic or ammonium sulphides and hydrogen-sulphides, e. g., NaHS, $NH_4HS$, $Ca(HS)_2$
  (3) Mercaptans, or other organic mercapto compounds
  (4) Carbon bisulphide, $CS_2$

[1] A preferred method of preparing these materials is to dissolve the amine in mineral oil, and then treat the mineral oil solution with hydrogen sulphide.

III. A. Organic compounds, preferably oxygen-bearing and especially those containing the hydroxyl radicle, such as:
  (1) Alcohols, e. g.
    Butyl alcohol
    Amyl alcohols
    Lauryl alcohol
    Cetyl alcohol
    Benzyl alcohol
    Phenyl ethyl alcohol
  (2) Phenolic compounds, e. g.
    Phenols, including
      Poly-hydroxy phenols and alkylated phenols
    Other hydroxy aromatic compounds such as:
      Salicyl aldehyde
      Salicylic acid
      Salicylates
  (3) Organic acids, e. g.
    Fatty acids and hydroxy fatty acids
    Naphthenic acids
    Aromatic acids
  (4) Other hydroxy aliphatic compounds such as esters and salts of hydroxy fatty acids
With
B. (1) Inorganic compounds containing phosphorus and sulphur, such as
    Phosphorus trisulphide
    Phosphorus penta-sulphide ($P_2S_5$)
    Phosphorus sulpho-chloride ($PSCl_3$)
  (2) Highly reactive organic compounds containing sulphur such as
    Thio-phosgene ($CSCl_2$)
    Phos-phenyl sulpho-chloride ($C_6H_5PSCl_2$)

The following is a brief exposition of certain methods by which the above reactions may be carried out in the preparation of products of the sort contemplated by the present invention:

The reaction may be carried out
1. By adding (B) directly to (A) and heating as required to cause reaction. In some cases, when the reaction requires a high temperature, pressures above atmospheric may be required to prevent vaporization of the reacting materials.
2. In the presence of an inert solvent such as ethyl alcohol. In this case one of the reacting materials, preferably B, is usually dissolved in the solvent before adding the other material. The mixture is then heated, as required, preferably in a vessel fitted with a reflux condenser to prevent loss of the solvent or in a closed pressure-resisting vessel.

NOTE.—Water may be used as the solvent when not too reactive with either of the reacting materials, e. g., benzyl chloride + $Na_2S_2$.

The organic product is separated from the inorganic material by one or more of the usual methods of purification. In many cases, it collects in a separate liquid layer which may be used directly or after treating with alkalies, washing with water or with solutions of alkalies and then with water. In this case, the product may be further purified by filtration usually preferably at elevated temperatures. In other cases the product may be separated by vacuum distillation when it is less volatile than the solvent used, and in this way may also be completely separated from undesirable inorganic by-products. It is sometimes desirable to insure the removal of relatively unstable material by first heating with alkalies (such as caustic soda, quick lime, etc.) or by distilling directly from such alkaline materials.

When the reaction product is a solid, at ordinary temperatures, it may sometimes be separated as a liquid by heating the mixture above its melting point, or it may be dissolved in a suitable solvent from which it may be crystallized. The same solvent used to carry out the reaction (notably ethyl alcohol) may also serve as the solvent from which to crystallize the product.

It is not necessary, and sometimes not desirable, that the reaction between (A) and (B) proceed to completion. For example, in Reaction I. above, since the most reactive portion of the halogen contained in (A) reacts first, the product of partial reaction may be sufficiently stable to be suitable for use. In the case of some special lubricating uses, where the prevention of seizure of the surfaces being lubricated is the most important consideration (e. g. in certain drawing operations) it may be desirable to use a product which still contains a large proportion of unreacted halogen even when such remaining halogen is of the highly reactive type.

When (A) contains one or more benzenoid groups to which part of the halogen may have become attached such "non-hydrolyzable" halogen will usually remain in the product when the reaction is complete, and may enhance the effectiveness of the product. (Example: reaction product of chlorinated benzyl chloride with $Na_2S_2$.)

*Choice of addition agent*

The choice of addition agent will depend upon the conditions encountered. The most stable addition agents should be employed when one or more of the following factors obtain:

1. Abnormally high operating temperatures, e. g. in (a) crank-case lubrication, (b) lubrication of bearings of heated machines; such as hot-rolls, oven conveyors, etc.
2. Protection from corrosion of metal parts exposed to lubricant is at least equally as important as protection of lubricated surfaces from injury due to excessive pressures, shock-loads, etc.
3. Operating conditions are such that moisture is liable to collect, by condensation or otherwise, in lubricant.
4. Operating conditions do not permit replacement of lubricant except at such widely spaced intervals of time that accumulation of decomposition products of less stable addition agents in lubricant would be damaging to metal parts.

Examples of relatively stable types of sulphur-bearing addition agents contemplated by this invention are the di-alkyl and di-aryl sulphides (RSR', where R and R' are alkyl or aryl radicles) for example:

di-amyl sulphide
    di-lauryl sulphide
    diphenyl sulphide
    dibenzyl sulphide When providing a lubricant of maximum film strength is the chief consideration, the relative stability of the addition agent is of secondary importance. If a sulphur-bearing addition agent is to be used alone, it will then be preferable to employ the more active compounds. The higher polysulphides are good examples of such addition agents, for example, diphenyl trisulphide, diphenyl tetrasulphide, diphenyl hexasulphide, butyl tetra sulphide, etc. The following are particularly desirable compositions of this general type:

(1) 1.14 parts by weight of diphenyl disulphide and .33 part of sulphur were heated in an atmosphere of nitrogen for thirty minutes at a temperature of 150° C. The resulting product was a dark brown, thick oil which mixed readily with the 98.53 parts of highly refined lubricating oil having a viscosity of about 300 seconds Saybolt at 100° F. The final lubricating composition had a film strength of more than three times that of the plain untreated mineral oil.

(2) .76 part of n-butyl sulphide and .50 part of sulphur were heated for sixteen hours at a temperature of 190° C. A brilliant orange oil was obtained which mixed readily with mineral oil. 1.26 parts of this product were mixed with 98.74 parts of a highly refined mineral oil having a viscosity of about 300 seconds Saybolt at 100° F. The final lubricating composition had a film strength of more than three and one-half times that of the plain untreated mineral oil.

In the case of the two examples described above, reactivity tests were carried out which showed that the sulphur in the final compositions was not present as free sulphur, but that it was in combined form.

With regard to the relative merits of alkyl and of aryl compounds, the aryl compounds are effective but many aryl compounds containing no alkyl groups have relatively low solubilities in mineral oils. For this reason, those aryl compounds are often to be preferred which contain some alkyl groups. For example, a preferred group of compounds are aryl derivatives of alkyl disulphides, e. g. dibenzyl disulphide, diphenyl diethyl disulphide

$(C_6H_5—C_2H_4—S—S—C_2H_4—C_6H_5)$ etc., as well as alkyl derivatives of aryl sulphides e. g. dixylyl disulphide—$(C_6H_4(CH_3)_2S)_2$.

When used in conjunction with a mineral lubricating oil, it is obvious that generally only such amounts of the addition agent may be included as are soluble in the specified amount of oil. By the term "soluble" as herein used, it is intended to indicate the ability to form not only true solutions but also any form of substantially permanently homogeneous composition when incorporated in mineral oil. With most of the compounds there is usually little difficulty, especially if the incorporation is effected in the manner described in Cornell Patent No. 2,042,880, and since quite small percentages often give remarkably improved results, it is seldom of extreme importance that the addition agents be oil-soluble in all proportions.

Obviously, the addition agent chosen should be sufficiently oil-soluble so that the amount used will remain in solution under the operating conditions encountered, preferably for automotive and other ordinary applications, at temperatures down to 20° below zero. The oil solubility will depend to some extent upon the character of the oil, usually being higher for the less viscous Gulf Coastal oils and lower for the viscous Pennsylvania oils in the case of mineral oils.

From the point of view of solubility, the most advantageous conditions would generally result from the use of a compound which is liquid and miscible with the oil base used. An example of such compound is diphenyl sulphide.

In the case of solid sulphur compounds, it is desirable that the solubility be as high as 10% and preferably above 1%. However, in the case of certain very effective sulphur compounds, or when used in cooperative combination with other addition agents, the solubility may be well below 1%, since concentrations of less than 1% of the sulphur compounds named herein are often effective, especially when used in such cooperative combination.

*Stability test*

The following is a more detailed description of one type of stability test using finely divided metallic iron.

The iron used to test the reactivity of the oils was prepared from finely ground ferric oxide. The ferric oxide was heated by means of an electric furnace, in a silica tube to a temperature of 850° F. By passing hydrogen through the tube at a medium rate, the ferric oxide was reduced to iron. The tube was maintained at 850° F.

for approximately ninety minutes, and then cooled naturally until the tube could be comfortably handled, a total period of 3½ to 4 hours. The hydrogen was passed through during the entire period. During reduction, the tube was revolved frequently for the purpose of stirring to obtain the reduction of all the ferric oxide. The iron on being removed from the tube was kept in medicinal mineral oil under an atmosphere of hydrogen. The iron thus obtained was extremely active, burning immediately to ferric oxide if it should be exposed to air on removal from the tube, necessitating the above precaution. This extraordinary activity or affinity was the property desired in preparing the iron in this manner.

The apparatus used for treating the iron with the oil consisted of a glass cylinder, 20 inches long, 2.5 inches in diameter. The cylinder was divided into two sections by a ground glass joint to facilitate the removal of the iron. One end of the tube was sealed, the other was closed by a two-holed rubber stopper. Through one hole, a glass tube extended almost to the bottom; the other hole contained a tube beginning at the stopper and connected to an aspirator.

To determine the stability or reactivity of the compounds dissolved in mineral oil, a small amount of iron was introduced into the reactivity apparatus together with a measured quantity of oil solution. Most of the air was then removed from the apparatus by means of a suction pump, and hydrogen bubbled through the oil into the cylinder by means of the long tube extending to the bottom. The hydrogen was passed through during the entire run to prevent any oxidation from occurring, and to provide some agitation of the oil and iron mixture. Next, the bottom of the cylinder was immersed in an oil bath, which had been heated to the temperature desired, and was kept there for 60 minutes. The temperature of the oil bath was indicated by a mercury thermometer, and was maintained within one degree of the temperature desired by means of micro-burners.

At the completion of the run, the reactivity tube was removed from the bath, most of the oil poured off, and the iron freed, except for a very small amount, of the remainder by absorption on porous paper. The iron was next placed in an evolution flask consisting of a Florence flask fitted with a thistle tube, the end of which almost touched the bottom of the flask, and a delivery tube extending into a graduated cylinder containing an ammoniacal solution of cadmium chloride. 100 cc. of 1:1 HCl was added through the thistle tube and the $H_2S$ evolved absorbed in the ammoniacal solution of cadmium chloride. The contents of the flask were heated to boiling to be sure that the last trace of $H_2S$ had been driven off. The precipitated cadmium sulphide was next treated with 60 cc. of 1:1 HCl, and the $H_2S$ evolved titrated immediately with standard potassium iodate-iodide solution, using starch as an indicator. This method of analysis gave the percentage of sulphur present as sulphide in the iron.

The contents of the evolution flask were evaporated almost to dryness three times, being taken up each time with 15 cc. HCl (conc.) and 5 cc. $H_2O$. During these evaporations, the yellow color of the solution was almost removed by the addition of stannous chloride. After the third evaporation, the yellow color was just removed with stannous chloride, the solution diluted to 200 cc. and 50 cc. of a saturated solution of mercuric chloride added. The ferrous iron was titrated with standard $K_2Cr_2O_7$ solution, using potassium ferricyanide as an outside indicator. A standard solution of ferrous ammonium sulphate was used for back titrations.

The amount of iron used in the test was determined in this manner rather than by weighing, because it was not desired to expose the iron to air before the test, nor to subject it to oil-removing solvents after the test.

Examples of test results obtained by the use of this method are as follows:

*Example I.—Oil solution 2% of N-butyl sulphone in highly refined mineral oil*

| Temp. deg. C. | S mg. | Fe gms. | Reactivity mg. S/gm. Fe |
|---|---|---|---|
| 100 | 3.93 | .326 | 12.00 |
| 100 | 5.19 | .440 | 11.81 |
| 150 | 3.03 | .188 | 16.13 |
| 150 | 8.27 | .488 | 16.95 |
| 175 | 3.47 | .243 | 14.32 |
| 200 | 6.43 | .462 | 13.93 |
| 240 | 5.40 | .384 | 14.10 |

*Example II.—1.98% diphenyl disulphide*

| Temp. deg. C. | S mg. | Fe gms. | Reactivity mg. S/gm. Fe |
|---|---|---|---|
| 80 | 6.30 | .306 | 20.61 |
| 140 | 5.75 | .264 | 21.83 |
| 199 | 4.89 | .266 | 18.45 |

*Example III.—1.75% diphenyl sulphide*

| Temp. deg. C. | S mg. | Fe gms. | Reactivity mg. S/gm. Fe |
|---|---|---|---|
| 85 | 11.35 | .572 | 19.86 |
| 150 | 10.80 | .498 | 21.70 |
| 199 | 5.04 | .256 | 19.65 |

*Example IV.—1.00% N-butyl disulphide*

| Temp. deg. C. | S mg. | Fe gms. | Reactivity mg. S/gm. Fe |
|---|---|---|---|
| 80 | 5.95 | .286 | 20.85 |
| 125 | 7.81 | .356 | 21.95 |
| 160 | 6.92 | .344 | 20.15 |
| 200 | 3.84 | .180 | 21.33 |

*Example V.—1.00% diphenyl sulphone*

| Temp. deg. C. | S mg. | Fe gms. | Reactivity mg. S/gm. Fe |
|---|---|---|---|
| 80 | 5.80 | .245 | 23.61 |
| 130 | 8.43 | .401 | 21.05 |
| 160 | 3.42 | .151 | 22.64 |
| 201 | 4.26 | .200 | 21.34 |

*Example VI.—1.00% N-butyl sulphide*

| Temp. deg. C. | S mg. | Fe gms. | Reactivity mg. S/gm. Fe |
|---|---|---|---|
| 80 | 8.62 | .438 | 19.64 |
| 130 | 7.26 | .340 | 21.38 |
| 160 | 9.45 | .410 | 23.01 |
| 200 | 7.85 | .355 | 22.10 |

*Example VII.—1.00% N-butyl mercaptan*

| Temp. deg. C. | S mg. | Fe gms. | Reactivity mg. S/gm. Fe |
|---|---|---|---|
| 80 | 3.95 | .201 | 19.64 |
| 130 | 5.78 | .271 | 21.31 |
| 160 | 4.76 | .223 | 23.08 |
| 200 | 3.39 | .146 | 23.19 |

*Example VIII.—1.47% diphenyl tetrasulphide*

| Temp. deg. C. | S mg. | Fe gms. | Reactivity mg. S/gm. Fe |
|---|---|---|---|
| 80 | 10.10 | .443 | 22.83 |
| 120 | 7.42 | .301 | 24.61 |
| 145 | 6.71 | .253 | 26.50 |
| 170 | 8.41 | .216 | 38.82 |
| 185 | 5.22 | .151 | 34.65 |
| 200 | 4.42 | .146 | 30.35 |

*Example IX.—1.26% N-butyl tetrasulphide*

| Temp. deg. C. | S mg. | Fe gms. | Reactivity mg. S/gm. Fe |
|---|---|---|---|
| 80 | 4.03 | .202 | 20.07 |
| 120 | 5.21 | .238 | 21.83 |
| 145 | 5.94 | .217 | 27.39 |
| 170 | 6.43 | .223 | 28.88 |
| 185 | 4.70 | .171 | 27.50 |
| 200 | 7.84 | .289 | 27.15 |

As a basis of comparison, solutions were also made up with elemental sulphur with the following results:

*Example X.—.50% sulphur*

| Temp. deg. C. | S mg. | Fe gms. | Reactivity mg. S/gm. Fe |
|---|---|---|---|
| 50 | 3.38 | .210 | 16.05 |
| 70 | 5.53 | .254 | 21.77 |
| 95 | 16.18 | .385 | 42.00 |
| 100 | 8.93 | .208 | 42.93 |
| 105 | 16.25 | .281 | 57.80 |
| 110 | 20.65 | .377 | 54.77 |
| 130 | 20.97 | .400 | 52.42 |
| 175 | 16.70 | .351 | 47.40 |

*Example XI.—.75% sulphur*

| Temp. deg. C. | S mg. | Fe gms. | Reactivity mg. S/gm. Fe |
|---|---|---|---|
| 50 | 6.80 | .419 | 16.20 |
| 75 | 8.82 | .320 | 27.51 |
| 88 | 14.42 | .302 | 47.80 |
| 95 | 23.02 | .361 | 63.95 |
| 100 | 15.62 | .238 | 65.72 |
| 110 | 17.01 | .284 | 59.84 |
| 150 | 13.65 | .295 | 46.32 |
| 175 | 9.49 | .206 | 46.20 |

*Example XII.—1.00% sulphur*

| Temp. deg. C. | S mg. | Fe gms. | Reactivity mg. S/gm. Fe |
|---|---|---|---|
| 45 | 5.37 | .312 | 17.10 |
| 62 | 4.66 | .264 | 17.60 |
| 85 | 8.13 | .282 | 28.85 |
| 90 | 8.76 | .285 | 30.70 |
| 94 | 17.78 | .235 | 75.60 |
| 95 | 24.54 | .403 | 60.90 |
| 100 | 15.26 | .216 | 70.65 |
| 100 | 28.00 | .383 | 73.10 |
| 109 | 37.20 | .527 | 70.62 |
| 110 | 12.67 | .171 | 74.19 |
| 125 | 13.91 | .260 | 53.51 |
| 125 | 13.90 | .226 | 61.50 |
| 149 | 14.08 | .250 | 56.32 |
| 174 | 9.56 | .233 | 41.03 |
| 195 | 10.77 | .214 | 50.23 |

It will be observed that the examples made up with elemental sulphur exhibit a maximum in the reactivity curve at a temperature of approximately 100° C. with maximum values of from about 60 to about 75 milligrams of sulphur per gram of iron. Both the temperature at which the maximum occurs and the value of the maximum are indications of the degree of reactivity. The lower the temperature and the higher the maximum, the more reactive the compound being tested.

It will be observed that for compounds of high stability, such as the sulphones and sulphides, no sharp maximum occurs, whereas for the slightly more reactive compounds, such as the polysulphides, containing more than 3 or 4 atoms of sulphur per molecule, a very low maximum may be observed but only at temperatures in excess of about 140° C.

The following is a detailed description of another type of stability test but in which finely divided metallic copper is used:

The copper used to test the reactivity of the oils was "Copper metal—Precipitated powder" purchased from The J. T. Baker Chemical Co. 100 grams of oil, together with 20 grams of the finely divided copper, are placed in a 150 cc. Soxhlet flask equipped with mechanically driven agitator and heated to a predetermined temperature and maintained at that temperature for five minutes. The oil is then immediately filtered through a Gooch crucible and the filtrate analyzed for sulphur. The sulphur content of the original oil is likewise determined and the percentage of sulphur removed by the treatment with copper calculated.

The following table is an example of the type of results obtained with this test:

*Sample No. 1*

92% refined mineral oil (SAE 90 gear oil) containing 0.5% naturally occurring combined sulphur 7.5% chlorinated paraffin wax 0.5% elemental sulphur

*Sample No. 2 (an example of a lubricating composition according to my invention)*

90% refined mineral oil (SAE 90 gear oil) containing 0.5% naturally occurring combined sulphur 7.5% chlorinated paraffin wax 2.5% dibenzyl disulphide (representing 0.6% of sulphur in combined form)

*Sample No. 3*

92.5% refined mineral oil (SAE 90 gear oil) containing 1.0% naturally occurring combined sulphur 7.5% chlorinated paraffin wax

| Sample No. | Temperature | Per cent original | Sulphur final | Reduction in per cent S |
|---|---|---|---|---|
| | °C. | | | |
| 1 | 175 | 1.0 | 0.4 | 0.6 |
| 1 | 150 | 1.0 | 0.5 | 0.5 |
| 2 | 175 | 1.1 | 0.4 | 0.7 |
| 2 | 150 | 1.1 | 1.1 | 0 |
| 3 | 175 | 1.0 | 1.0 | 0 |
| 3 | 150 | 1.0 | 1.0 | 0 |

In these tests the sulphur naturally occurring in the oils was not substantially affected by the copper treatment in any case; whereas, the sulphur added as elemental sulphur was completely removed in every case. The sulphur added in the form of dibenzyl disulphide was not removed at 150° C. but was completely removed at the higher temperature of 175° C.

The type of sulphur compounds which are the subject of this invention may, in general, be defined by means of the above test as those which, when included in a lubricating composition in amounts effective for my purpose, will not react substantially with copper at temperatures below about 100° C. or preferably about 120° C. but which will react with copper at temperatures below about 250° C. and preferably below about 220 C., or still more desirably, below about 200° C.

*The composition base*

If the aforementioned "addition agents" are added to a lubricating base instead of used in their pure state, such base may be any suitable lubricating composition such as, for example, a mineral oil. It is to be noted, however, that the aforementioned compounds are effective to improve any lubricating compositions which are not incompatible with such addition agents so that the latter may function in the manner previously described to the production of the anti-fluxing film over the bearing surfaces.

While throughout the present description a lubricating composition made in accordance with the present invention has been described as comprising either the addition agents in their pure state or a mixture of such addition agents with a suitable oil, it is to be understood, however, that since lubricating combinations in accordance with this invention are particularly applicable for use as greases, bodying material, such as metallic soaps and the like, may be included in the composition without departing from the principles of the invention.

When admixed with mineral oil to produce a lubricating composition such as may be used for gears and the like, concentrations of from about 5% to 20% of the addition agent and often from about 2% to 10% in the total composition have been demonstrated to be very effective in producing the above desirable results. Certain compounds which are relatively active may be used in lubricating compositions designed for general usage when such compounds are present in amounts of about 1 to 5% and sometimes even from about 0.5 to 2.5%, or less.

When, however, the viscosity of the compound is sufficiently high or the particular usage requires little or no thick-film lubrication, it may often be used in a substantially pure state or as the primary lubricating constituent, only that amount of mineral oil being present as may be required to afford the characteristics desired.

The percentages above given pertain to the use of the hereinbefore enumerated organic sulphur compounds as the sole addition agents. However, when such organic sulphur compounds are used in combination with other compounds, such as organic halogen compounds, as disclosed and claimed in the copending application of Carl F. Prutton, Albert K. Smith and Harry E. Johnson, Serial No. 744,600, filed September 17, 1934, the organic sulphur compounds mentioned will be found very effective when used in concentrations of fractions of 1%, such as 0.10% of the total composition.

For certain uses and under certain conditions where high operating temperatures are encountered the addition agents of this invention should have vapor pressures less than atmospheric pressure at temperatures up to 140° C. It is often desirable that the vapor pressure be less than atmospheric at temperatures up to 170° C. In the case of compounds which are stable at temperatures up to their boiling points, this condition may be expressed by stating that the boiling point of the compound should be higher than 140° C., and for certain uses, higher than 170° C.

*Uses*

A lubricating composition compounded in accordance with the present invention is generally suitable for all lubrication purposes; however, the same is particularly suited for the lubrication of gears and the like. In compounding a gear lubricant in accordance with the principles of this invention, a mineral oil having a viscosity between S. A. E. 80 and S. A. E. 250 will be found best suited as the base to which the addition agents may be added in any of the above mentioned concentrations, depending upon the character of the addition agent and the use to which the lubricating composition is to be put. Since certain of the so-called addition agents hereinbefore defined (e. g., the higher polysulphides) are in general relatively active when subjected to high temperatures, lubricating compositions containing them are not particularly adapted for use as lubricants in the crank-cases of internal combustion engines. However, certain of the more stable addition agents are suitable for use in crankcase lubricants, particularly in the lubrication of certain typs of Diesel engines. Examples are certain of the mercapto-, and thio-organic acids, and esters and salts of them (e. g., mercapto stearic acids, methyl mercapto-stearates, calcium mercapto stearates, methyl thiostearates, methyl and lauryl thiobenzoates, aluminum thionaphthenates), and thioketones (e. g., dibutyl and di-amyl thioketones, thiobenzophenone). When addition agents of this type are employed, a much wider field of use is opened to the lubricant and may be extended to include the lubrication of such bearing metals as those containing a characterizing amount of iron, copper, lead, tin, silver, nickel or cadmium.

While mineral oil generally may be the principal ingredient of my lubricant, it is not essential that it be the only ingredient other than my addition agent, provided that there should be no additional ingredient which is incompatible with such addition agent. It is within the contemplation of this invention to include, if necessary or desirable, such other addition agents as are commonly added to improve any of the properties of the lubricant such as the viscosity-index or cold test, or to inhibit corrosion, oxidation and the like.

The compounds of the type contemplated by this invention, when employed as addition agents to mineral oils, are generally such as will provide a lubricating composition characterized by its having a high film strength at least one and one-half times that of the mineral oil of which it is predominantly composed when employed in amounts of 20% or less, based on the amount of mineral oil.

This application is a continuation in part of my copending application, Serial No. 737,070, filed July 26, 1934.

Other modes of applying the principle of my invention may be employed instead of the one explained, change being made as regards the materials employed in carrying out the process, provided the ingredient or ingredients states in any of the following claims or the equivalent of such stated ingredient or ingredients be employed.

I therefore particularly point out and distinctly claim as my invention:

1. An extreme pressure lubricating composition characterized by having a high film strength at least one and one-half times that of the mineral oil of which it is predominantly composed, comprising a major portion of mineral oil and from an effective amount to 20%, based on the amount of mineral oil, of an organic sulphur compound of the type which when included in the lubricant, will not show a substantial increase in reactivity with iron at temperatures below about 100° C. but will show such an increase in reactivity at temperatures below 250° C.

2. An extreme pressure lubricating composition characterized by having a high film strength at least one and one-half times that of the mineral oil of which it is predominantly composed, comprising a major portion of mineral oil and from an effective amount to 20%, based on the amount of mineral oil, of an organic sulphur compound of the type which when included in the lubricant, will not show a substantial increase in reactivity with iron at temperatures below about 100° C. but will show such an increase in reactivity at temperatures below 220° C.

3. A lubricating composition characterized by being predominantly mineral oil and having a high film strength at least one and one-half times as great as that of such mineral oil in its pure state and containing a substantial amount of an oil soluble organic sulphur compound which will react, to a substantial extent, only under conditions imposed by unit pressures on the order of upwards of 10,000 pounds per square inch with metallic bearing surfaces of the type containing a characterizing amount of a metal of the class consisting of iron and copper.

4. An extreme pressure lubricating composition comprising a major proportion of mineral oil, the film strength of which has been substantially increased by the addition thereto of an effective amount less than 20%, based on such mineral oil, of an organic sulphur compound of the type which when included in the lubricant, will not show a substantial increase in reactivity with iron at temperatures below about 100° C. but will show such an increase in reactivity at temperatures below 250° C.

5. An extreme pressure lubricating composition comprising a major proportion of mineral oil, the film strength of which has been substantially increased by the addition thereto of an effective amount less than 20%, based on such mineral oil, of an organic sulphur compound of the type which does not readily polymerize and which when included in the lubricant, will not show a substantial increase in reactivity with iron at temperatures below about 100° C. but will show such an increase in reactivity at temperatures below 250° C.

6. An extreme pressure lubricating composition comprising a major proportion of mineral oil, the film strength of which has been substantially increased by the addition thereto of an effective amount less than 20%, based on such mineral oil, of an organic sulphur compound of the type having a molecular weight less than 500 and which when included in the lubricant, will not show a substantial increase in reactivity with iron at temperatures below about 100° C. but will show such an increase in reactivity at temperatures below 250° C.

7. An extreme pressure lubricating composition comprising a major proportion of mineral oil, the film strength of which has been substantially increased by the addition thereto of an effective amount less than 20%, based on such mineral oil, of an organic sulphur compound of the type having a molecular weight less than 300 and which when included in the lubricant, will not show a substantial increase in reactivity with iron at temperatures below about 100° C. but will show such an increase in reactivity at temperatures below 250° C.

8. An extreme pressure lubricating composition comprising a major proportion of mineral oil, the film strength of which has been substantially increased by the addition thereto of an effective amount less than 20%, based on such mineral oil, of an incomplex organic sulphur compound of the type which when included in the lubricant, will not show a substantial increase in reactivity with iron at temperatures below about 100° C. but will show such an increase in reactivity at temperatures below 250° C.

9. An extreme pressure lubricating composition characterized by having a high film strength at least one and one-half times that of the mineral oil of which it is predominantly composed, comprising a major portion of mineral oil and from an effective amount to 20%, based on the amount of mineral oil, of an aliphatic sulphur compound of the type which when included in the lubricant, will not show a substantial increase in reactivity with iron at temperatures below about 100° C. but will show such an increase in reactivity at temperatures below 250° C.

10. An extreme pressure lubricating composition characterized by having a high film strength at least one and one-half times that of the mineral oil of which it is predominantly composed, comprising a major portion of mineral oil and from an effective amount to 20%, based on the amount of mineral oil, of an aromatic sulphur compound of the type which when included in the lubricant, will not show a substantial increase in reactivity with iron at temperatures below about 100° C. but will show such an increase in reactivity at temperatures below 250° C.

11. An extreme pressure lubricating composition characterized by having a high film strength at least one and one-half times that of the mineral oil of which it is predominantly composed, comprising a major portion of mineral oil and from an effective amount to 20%, based on the amount of mineral oil, of a cyclic organic sulphur compound of the type which when included in the lubricant, will not show a substantial increase in reactivity with iron at temperatures below about 100° C. but will show such an increase in reactivity at temperatures below 250° C.

12. An extreme pressure lubricating composition characterized by having a high film strength at least one and one-half times that of the mineral oil of which it is predominantly composed, comprising a major portion of mineral oil and from an effective amount to 20%, based on the amount of mineral oil, of an organic sulphur compound having the formula R—S—R' where R is an organic radicle and R' is of the class consisting of hydrogen and organic radicles, said compound being of the type which when included in the lubricant, will not show a substantial increase in reactivity with iron at temperatures below about 100° C. but will show such an increase in reactivity at temperatures below 250° C.

13. An extreme pressure lubricating composition characterized by having a high film strength at least one and one-half times that of the mineral oil of which it is predominantly composed, comprising a major portion of mineral oil and from an effective amount to 20%, based on the amount of mineral oil, of an organic polysulphide of the type which when included in the lubricant, will not show a substantial increase in reactivity with iron at temperatures below about 100° C. but will show such an increase in reactivity at temperatures below 250° C.

14. An extreme pressure lubricating composition characterized by having a high film strength at least one and one-half times that of the mineral oil of which it is predominantly composed, comprising a major portion of mineral oil and from an effective amount to 20%, based on the amount of mineral oil, of a mercaptan having a vapor pressure less than atmospheric at 170° C. and of the type which when included in the lubricant, will not show a substantial increase in reactivity with iron at temperatures below about 100° C. but will show such an increase in reactivity at temperatures below 250° C.

15. An extreme pressure lubricating composition characterized by having a high film strength at least one and one-half times that of the mineral oil of which it is predominantly composed, comprising a major proportion of mineral oil and from an effective amount to 20%, based on the amount of mineral oil, of a sulphone.

16. An extreme pressure lubricating composition characterized by having a high film strength at least one and one-half times that of the mineral oil of which it is predominantly composed, comprising a major proportion of mineral oil and from an effective amount to 20%, based on the amount of mineral oil, of an oxidation product of a mercaptan.

17. An extreme pressure lubricating composition characterized by having a high film strength at least one and one-half times that of the mineral oil of which it is predominantly composed, comprising a major proportion of mineral oil and from an effective amount to 20%, based on the amount of mineral oil, of an organic sulphur compound of the type which, when included in the lubricant, will not react substantially with copper at temperatures below about 100° C. but will react with copper at temperatures below about 250° C.

18. An improved lubricant composition comprising a viscous hydrocarbon oil having in admixture therewith a minor proportion of dibenzyl disulfide, said disulfide being present in the oil in an amount, up to about 10 per cent, sufficient to increase the capacity of the oil to withstand extremely high unit loading.

19. An improved lubricant composition comprising a viscous hydrocarbon oil having in admixture therewith a minor proportion of an organic sulphur compound of the class consisting of sulphides and polysulphides, said organic sulphur compound being present in the oil in an amount up to about 10% sufficient to increase the capacity of the oil to withstand extremely high unit loading, said organic sulphur compound being of the type which when included in the lubricant, will not react substantially with copper at temperatures below about 100° C., but will react with copper at temperatures below about 250° C.

20. An extreme pressure lubricating composition characterized by having a high film strength at least one and one-half times that of the mineral oil of which it is predominantly composed, comprising a major proportion of mineral oil and from an effective amount to 20%, based on the amount of mineral oil, of an alkylated aryl organic sulphur compound of the type in which at least one alkyl group is attached to an aryl nucleus.

21. An extreme pressure lubricating composition characterized by having a high film strength at least one and one-half times that of the mineral oil of which it is predominantly composed, comprising a major proportion of mineral oil and from an effective amount to 20%, based on the amount of mineral oil, of an arylated alkyl organic sulphur compound of the type in which at least one aryl group is attached to an alkyl group.

22. A lubricating composition in accordance with claim 21 in which the organic sulphur compound is selected from the class consisting of sulphides and polysulphides.

23. An extreme pressure lubricating composition characterized by having a high film strength at least one and one-half times that of the mineral oil of which it is predominantly composed, comprising a major proportion of mineral oil and from an effective amount to 20%, based on the amount of mineral oil, of an organic sulphur compound of the type R—S—R' where R is an organic radicle which contains both an aromatic nucleus and an aliphatic group and R' is of the class consisting of hydrogen and organic radicles.

24. An extreme pressure lubricating composition characterized by having a high film strength at least one and one-half times that of the mineral oil of which it is predominantly composed, comprising a major proportion of mineral oil and from an effective amount to 20%, based on the amount of mineral oil, of an organic sulphur compound containing an organic radicle characterized by the presence therein of both an aromatic nucleus and an aliphatic radicle containing two or more carbon atoms.

25. An improved lubricant composition comprising a viscous hydrocarbon oil having in admixture therewith a minor proportion of a diaryl disulphide, said disulphide being present in the oil in an amount, up to about 10%, sufficient to increase the capacity of the oil to withstand extremely high unit loading.

26. An improved lubricant composition comprising a viscous hydrocarbon oil having in admixture therewith a minor proportion of a hydrocarbon disulphide, said disulphide being present in the oil in an amount, up to about 10%, sufficient to increase the capacity of the oil to withstand extremely high unit loading.

27. An extreme pressure lubricating composition characterized by having a high film strength at least one and one-half times that of the mineral oil of which it is predominantly composed, comprising a major proportion of mineral oil and from an effective amount to 20%, based on the amount of mineral oil, of ethyl-phenyl-ethyl mercaptan.

28. An extreme pressure lubricating composition characterized by having a high film strength at least one and one-half times that of the mineral oil of which it is predominantly composed, comprising a major proportion of mineral oil and from an effective amount to 20%, based on the amount of mineral oil, of n-butyl sulphone.

CARL F. PRUTTON.